June 27, 1950     M. B. HERBRICK     2,512,646
TIRE CHAIN RELEASING AND HOLDING DEVICE
Filed May 10, 1948
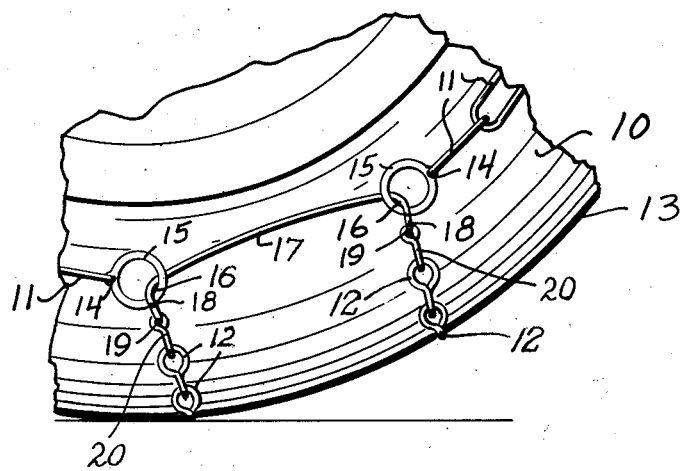
INVENTOR.
Milton B. Herbrick
BY
Sam J. Slotsky
ATTORNEY Patented June 27, 1950

2,512,646

UNITED STATES PATENT OFFICE 2,512,646

TIRE CHAIN RELEASING AND HOLDING DEVICE

Milton B. Herbrick, Sterling, Colo.

Application May 10, 1948, Serial No. 26,185

1 Claim. (Cl. 152—213)

My invention relates to a tire chain arrangement.

An object of my invention is to provide a tire chain securing and releasing device in combination, which will provide means for firmly retaining the tire chain on a tire, and additionally provide means for conveniently releasing the chain.

A further object of my invention is to provide means for accomplishing the above results in a very simple arrangement.

With these and other objects in view, my invention consists in the construction, arrangement, and combination of the various parts of my device, whereby the objects contemplated are attained, as hereinafter more fully set forth, pointed out in my claims, and illustrated in the accompanying drawing, in which the single figure is a side elevation of the releasing and holding device as observed from the inside of a tire.

My invention contemplates a simple arrangement for securing a tire chain to a tire, and with further means whereby the chain can be readily detached. I have used the character 10 to designate the inner side wall of a tire casing, or the side which is facing away from the outside of the vehicle. I have further used the character 11 to designate a series of chain links which provide the inner side chain of the chain arrangement, and I have used the character 12 to designate the usual cross links which straddle the tire 13. Attached at 14 to either of the end links 11 are the rings 15, and passing through the rings 15 at 16 is a slightly arcuate bar 17 which includes the inturned ends 18, which ends are attached at 19 to an end link 20 which end link 20 forms the inner extremity of the cross chains made up of the links 12. The cross links 12 are positioned so that they converge slightly towards each other as shown by the figure, and the outer extremities of the cross link members 12 are suitably attached to the outer links 11 on the outside of the tire, in which one extremity can be permanently attached if desired and with the other extremity being releasable for releasing the chain.

It will be observed that during rotation of the tire that any centrifugal action of the inner series of links 11 will be retarded by means of the engagement at 16 of the bar 17, and when it is desired to release the chain, the releasable end of one of the cross chain members 12 is detached from the outer link, whereby the bar 17 and the further cross link member 12 can be drawn through the ring 15, thereby disengaging the entire chain. The rings 15 are made sufficiently large so that there will be a free passage therethrough of the bar 17 as well as the links 12.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

A tire chain holding and releasing device including an inner side chain divided and forming two end portions, a ring connected to each end portion of the inner side chain, a member including bent extensions received within said rings, cross chains attached at the termination of said bent extensions, said cross chains being attached to the outer side chain of the tire chain, whereby release of either of said cross chains from the outer side chain will provide means for passing said member and the other cross chain through either of said rings for detaching said tire chain.

MILTON B. HERBRICK.

REFERENCES CITED

The following references are of record in the file of this patent:

UNITED STATES PATENTS

| Number | Name | Date |
|---|---|---|
| 1,059,183 | Martin | Apr. 15, 1913 |
| 1,935,035 | Levi | Nov. 14, 1933 |

FOREIGN PATENTS

| Number | Country | Date |
|---|---|---|
| 547,787 | Germany | Feb. 8, 1931 |